April 11, 1950 — R. M. BALDWIN — 2,503,316
LAWN MOWER REEL BLADE COMB ATTACHMENT
Filed June 1, 1948
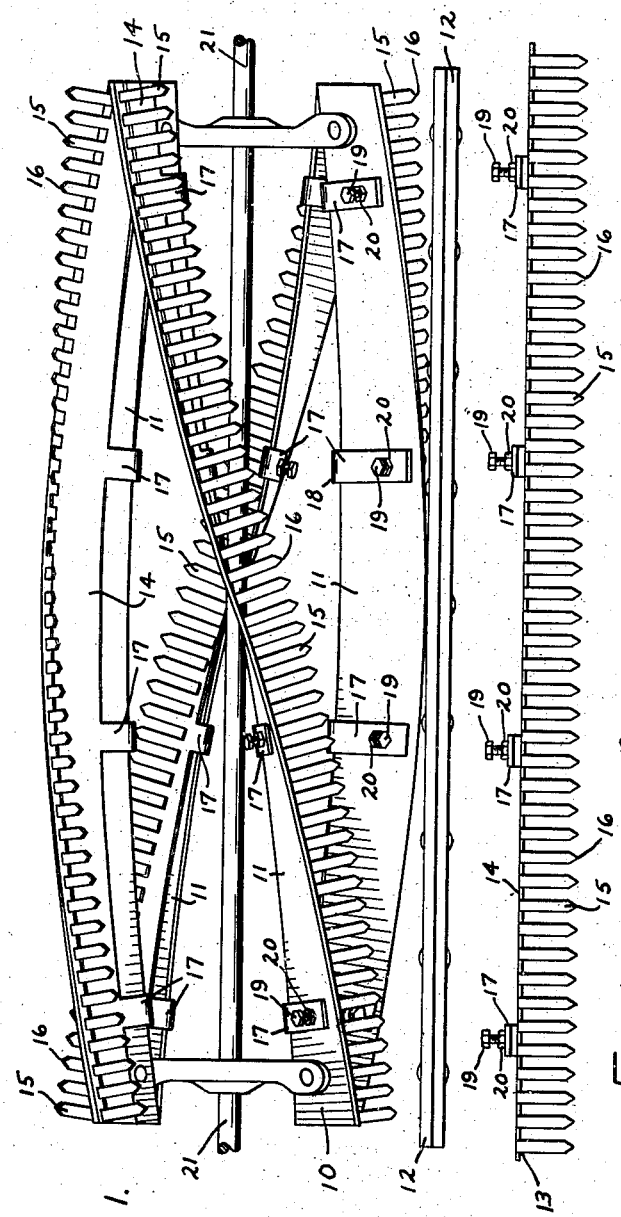
INVENTOR,
ROBERT M. BALDWIN,
By Herbert A. Minturn,
ATTORNEY.

Patented Apr. 11, 1950

2,503,316

UNITED STATES PATENT OFFICE 2,503,316

LAWN MOWER REEL BLADE COMB ATTACHMENT

Robert M. Baldwin, New Castle, Ind.

Application June 1, 1948, Serial No. 30,397

3 Claims. (Cl. 56—294)

This invention relates generally to a lawn mower of that type employing a revolving reel having a plurality of spirally disposed blades therearound, and more specifically the invention relates to an attachment to be secured to each of the several blades of the reel whereby standing stocks and other vegetation normally too high to be cut by the mower will be engaged and pulled under the reel whereby the knives may cut off that vegetation at the same level as the grass is normally cut.

A primary object of the invention is to provide a structure for the purpose above indicated which may be readily applied to a lawn mower without having to alter the knives in any respect. A further primary object of the invention is to provide such a structure which will be most effective in engaging the standing stocks of the vegetation whereby they may be engaged and moved gradually inwardly and under the reel knife whereby the knife may exert the shearing action between it and the fixed knife bar extending across the mower. A further advantage of the invention lies in the fact that the structure embodying it may be produced at the relatively low cost and may be applied to the mower very readily by the operator and removed at will.

These and many other objects and advantages of the invention will become apparent to those versed in the art in the following description in the one particular form of the invention as illustrated in the accompanying drawing, in which:

Fig. 1 is a view in front elevation of a mower reel with the invention applied thereto;

Fig. 2, a top plan view of the structure embodying the invention shown apart from the reel; and Fig. 3, a detail on an enlarged scale in fore and aft vertical section through a reel blade and the applied structure.

Referring to the drawing, in which like characters of reference indicate like parts in the several views, there is illustrated the usual reel 10, herein shown as having four blades 11. Each of these blades 11 constitutes a cutting knife with a cutting edge in a common cylindrical path, the blade itself being arranged around the reel in a spiral or helical manner, all as is well known to those versed in the art. Then below the reel is the usual cutting bar 12 which is stationarily mounted to be in close proximity to the path of the outer cutting edges of the blades 11 so that a shearing action is exerted between the blades and the knife 12.

I form a structure primarily in the shape of a coarse toothed comb designated generally by the number 13. This structure has a back strap or band 14 from which the several teeth 15 extend originally in a common plane and terminate by pointed ends 16. The teeth 15 are regularly spaced apart along the band 14, and the spacing between these teeth is sufficient to permit stems such as dandelion stems and the like to enter therebetween.

At regular intervals along the band 14, along that edge opposite the edge from which the teeth 15 extend, are provided a number of fingers 17 which are bent over and around down along the opposite side of the band 14 from which side the teeth 15 extend. The fingers 17, the band 14, and the teeth 15, are preferably made out of a spring material such as spring steel, and the fingers 17 are normally bent by their free ends inwardly toward the band 14 so that they are required to be shifted outwardly from the band 14 to permit these fingers 17 to engage on the normally backsides of the reel blades 11, as indicated in Fig. 1 so as to position the band 14 on the leading or front sides of the blades 11 respectively. The band 14 has a width in reference to the blade 11, and the turned over fingers 17 which will locate the fingers 15 just above the cutting edges of the blades 11, as best indicated in Fig. 3, whereby the fingers 15 will clear the stationary knife 12 as the reel revolves thereacross. The upper loops 18 of the engaging fingers 17 seat downwardly on the edge of the knife 11 so as to locate the fingers 15 as just indicated.

Each of the engaging fingers 17 is provided with some means for securing the fingers 17 to the blades 11, and such means herein constitute a set screw 19 passing through the fingers 17 and in each instance, and a lock nut 20 carried by the screw 19 to be run down the screw in abutment with the outside face of the fingers 17.

As above indicated, the comb 13 is generally formed in a straight manner as indicated in Fig. 2, and then it is curved around the blade 11 in each instance to have the band 14 be in contact with the face of the blade 11. Since the entire structure is made out of a springlike material, it will yieldingly form to the shape of the blade 11 and permit the engaging fingers 17 to be slipped thereover for engagement as above indicated. It is important to note that by reason of the shape of each of the blades 11, which shape is in accordance with the standard practice, the teeth 15 will extend from the blade 11 and in each instance substantially at right angles to its face, and therefore the teeth 15 will be angularly disposed in relation to the straightforward path of the reel itself. In other words, the teeth 15 will extend to the right hand side, Fig. 1, of planes normally passed through the reel axle 21. By reason of this angular placement of the teeth 15, the weeds or other stocks will be engaged between adjacent teeth and be pulled around by the revolution of the reel to be carried back across the stationary knife 12, all without the stock or stem escaping from the engagement between the adjacent teeth. This angular displacement of the teeth is essential to perform this action.

This action is obtained of course by reason of the relatively sloping faces or edges of the teeth 15 when applied to the blades 11 as will be noted in Fig. 1, where the teeth on the most forward blade 11 extend generally to the right, so that a weed entering between any two adjacent teeth 15 will be normally carried somewhat to the left as it slides back along one of the teeth 15 until that weed or stock actually strikes the cutting edge of the blade 11 itself, where the stock is held against slipping forwardly by reason of the angularity of that tooth.

While I have herein shown and described my invention in the one particular form, it is obvious that structural variations may be employed, particularly in the means for mounting the comb on the separate blades 11, and I therefore do not desire to be limited to that precise form beyond the limitations which may be imposed by the following claims.

I claim:

1. For a lawn mower of a reel type having cutting blades spirally disposed therearound, and a fixed shear knife across which said blades travel, the combination with one of said blades of a comb mounted thereon having spaced apart teeth therealong extending in respect to side edges substantially normally to the faces of the blade and extending rearwardly thereof to be spaced to clear said shear knife when carried thereover; said teeth also being sloped back from the cutting edges of said blade at an acute angle thereto toward the axis of blade revolution.

2. The combination with a lawn mower reel spirally formed cutting blade, and a shear plate across which said blade travels, of a comb attached thereto comprising a band for contact against the relatively forward face of the blade, a plurality of spaced apart teeth extending approximately perpendicular from the outer edge of the band, means extending from the opposite band end for engaging over the inner, non-cutting edge of the blade, to secure the comb to said blade and to hold said teeth clear at all times of said shear plate.

3. A comb for detachable engagement with a lawn mower reel blade comprising a band to bear against and along the leading face of said blade; a plurality of teeth along and extending from an edge portion of said band to have tooth axes in planes normal to the plane of said band, said teeth being spaced apart one from another; and means carried by said band for fixing said band on said blade; said teeth extending in a leading direction from said band in respect to intended travel of said blade; said band fixing means consisting of fingers turned over in U-shape to extend over and around to yieldingly grip said blade between said band and fingers, and means for fixing the fingers along said blade to have their outer ends spaced within the circumferential line of blade travel.

ROBERT M. BALDWIN.

REFERENCES CITED

The following references are of record in the file of this patent:

UNITED STATES PATENTS

| Number | Name | Date |
| --- | --- | --- |
| 902,187 | Warrenfeltz | Oct. 27, 1908 |
| 1,109,776 | McGriff | Sept. 8, 1914 |
| 1,662,849 | Dailey | Mar. 20, 1928 |
| 2,042,854 | Maccmochie | June 2, 1936 |

FOREIGN PATENTS

| Number | Country | Date |
| --- | --- | --- |
| 15,930 | Great Britain | of 1909 |